United States Patent [19]

Bock

[11] Patent Number: 5,267,806
[45] Date of Patent: Dec. 7, 1993

[54] CONNECTOR ASSEMBLY FOR A TUBULAR MEMBER

[75] Inventor: Robert E. Bock, Woodbury, Conn.

[73] Assignee: Illinois Tool Works Inc., Glenview, Ill.

[21] Appl. No.: 933,250

[22] Filed: Aug. 21, 1992

[51] Int. Cl.⁵ .......................... F16B 7/18; F16B 9/00; F16B 12/20
[52] U.S. Cl. .................................. 403/260; 403/297
[58] Field of Search ............... 403/260, 297; 166/124; 411/55, 60, 61

[56] References Cited

U.S. PATENT DOCUMENTS

| 4,596,487 | 6/1986 | Piget | 403/297 |
| 4,764,065 | 8/1988 | Johnson | 403/297 X |
| 4,997,304 | 3/1991 | Choy | 403/297 X |

FOREIGN PATENT DOCUMENTS 921435  2/1973  Canada.
2399566  4/1979  France ................. 403/297

Primary Examiner—Randolph A. Reese
Assistant Examiner—Christopher J. Novosad
Attorney, Agent, or Firm—Schwartz & Weinrieb

[57] ABSTRACT

A connector assembly for attaching a free end of a hollow tubular member to another article includes a bushing member for insertion within a free open end of the tubular member and a clip member for engagement of at least one interior surface of the hollow tubular member and for retaining the bushing member within the hollow tubular member, and an attachment member for connecting the article to the bushing member disposed within the tubular member.

20 Claims, 1 Drawing Sheet

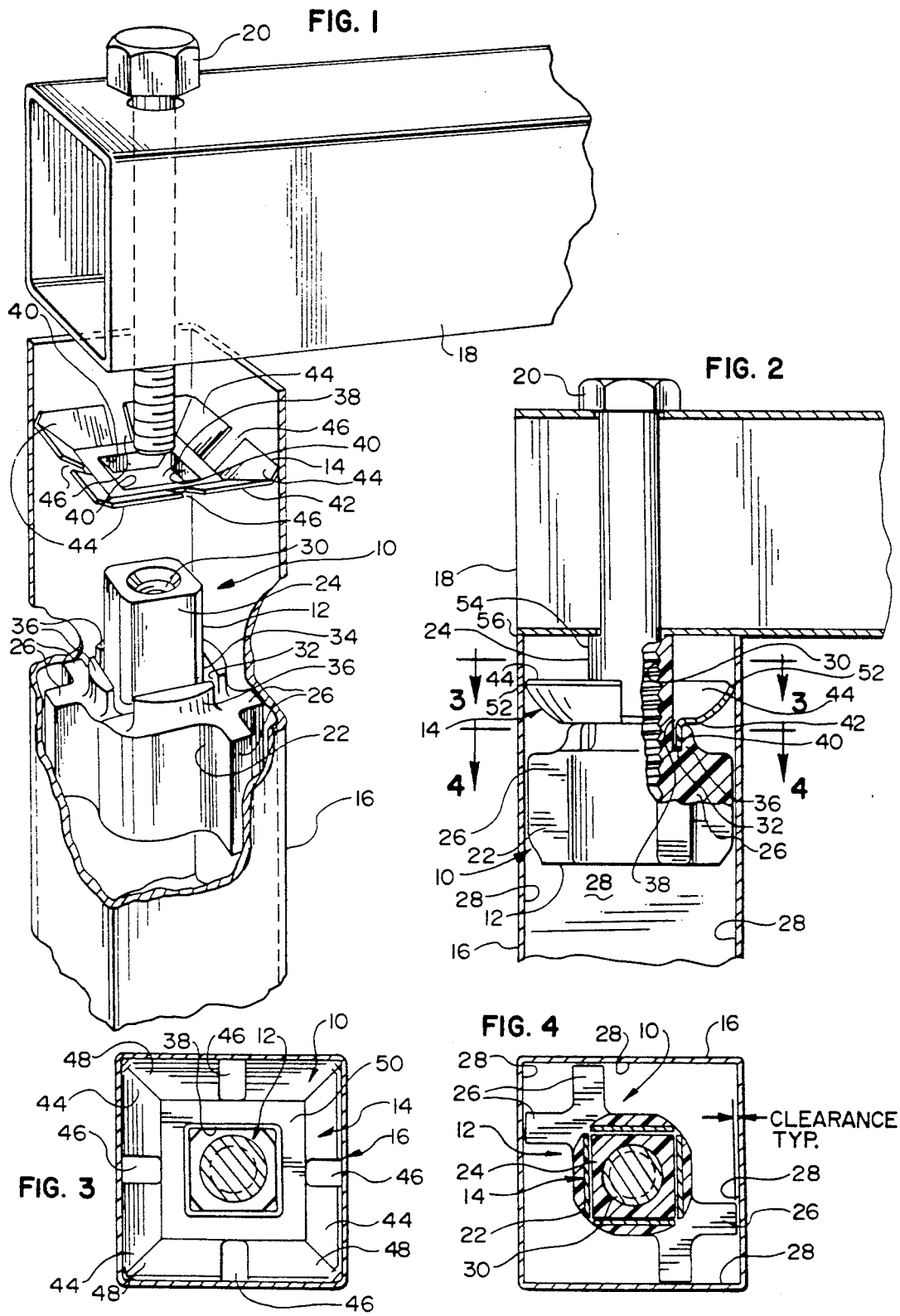

CONNECTOR ASSEMBLY FOR A TUBULAR MEMBER

BACKGROUND OF THE INVENTION

1. Field of the Invention

The invention relates generally to a connector assembly, and more particularly to a connector assembly for attaching a free end of a hollow tubular member, such as a chair leg, to another article, such as a cross-brace, where the connector assembly can be readily inserted and retained within the open end of the tubular member and the other article can be readily attached to the connector assembly.

2. Description of the Related Art

In order to connect a free open end of a tubular member to another article, some type of connector and/or assembly is typically required. For example, the free end of a tubular chair or table leg is typically mounted to another tubular leg, cross-brace, table top or a foot cap or member to provide a finished assembly, a stable construction and/or prevent marring or sliding of a chair or table upon a floor.

Connector assemblies typically rely on some type of attachment to the tubular member with an additional fastening member, such as a screw, rivet or the like or an adhesive. Such assemblies, however, usually increase costs by requiring additional parts and assembly, do not provide adequate retention against a removal force and the fasteners can be visible from the exterior of the tubular member and detract from its appearance.

It therefore is desirable to provide a connector assembly for the free open end of a hollow tubular member which is readily mountable and retains itself within the interior of the tubular member against a removal force, does not require any additional fasteners or adhesives, is not visible from the exterior of the tubular member and can be connected to another article.

SUMMARY OF THE INVENTION

The invention provides a connector assembly for attaching a free end of a hollow tubular member to another article including a bushing member for insertion within a free open end of the tubular member. The bushing member has associated therewith a clip member for engagement of at least one interior surface of the hollow tubular member and for retaining the bushing member within the hollow tubular member. An attachment member is also associated with the bushing member for connecting another article to the bushing member.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 1 is a perspective exploded view illustrating the connector assembly of the invention positioned within the interior of a first tubular member, illustrated in partial section, and with a second tubular member positioned for connection to the free open end of the first tubular member;

FIG. 2 is a cross-sectional view of the connected first and second tubular members of FIG. 1 illustrating the connector assembly of the invention in partial section and mounted within the first tubular member;

FIG. 3 is a cross-sectional view of the connector assembly of the invention and the first tubular member taken along line 3—3 of FIG. 2 and in the direction indicated generally illustrating the engagement between the clip member and the interior of the first tubular member; and FIG. 4 is a cross-sectional view of the connector assembly of the invention and the first tubular member taken along line 4—4 of FIG. 2 and in the direction indicated generally illustrating the alignment between the bushing member and the interior of the first tubular member.

DESCRIPTION OF THE PREFERRED EMBODIMENT

Referring to FIG. 1, the connector assembly of the invention is designated generally by the reference numeral 10. The assembly 10 includes a bushing 12 and a clip 14.

Briefly, the assembly 10 preferably is utilized to connect a first rectangular elongate tubular member 16 to a second rectangular elongate tubular member 18 with a fastener 20, such as a bolt, screw or the like. It is to be understood, however, that the assembly 10 can be used to connect any two members of any shape, size and cross-section so long as one member includes structure for receiving the assembly 10 according to the teachings of the present invention.

As FIGS. 1 and 4 illustrate, the bushing 12 preferably is formed from plastic and includes a body portion 22, a neck portion 24 and two pairs of engagement or alignment legs 26, one pair each formed on opposite sides of the body portion 22. As FIG. 4 illustrates, the legs 26 are formed to provide alignment of the body portion 22 with respect to interior surfaces 28 of the first tubular member 16 and with a slight predetermined clearance therebetween sufficient for easy insertion of the bushing 12 within the tubular member 16.

Preferably, the legs 26 are positioned for engagement and alignment with surfaces 28 proximate opposite corners of the rectangular tubular member 16, but can vary. For example, the legs 26 can be formed to engage and align with the midpoints or any other portion of the surfaces 28 or the body portion 22 can be formed without the legs 26 and with a larger rectangular shape for providing the desired engagement and alignment.

The neck 24 preferably includes an axial bore 30 which is threaded along at least a portion of its length for receiving the bolt 20 therein. When the bushing 12 is inserted within the tubular member 16, the legs 26 substantially align the bore 30 with the longitudinal axis of the tubular member 16. The bore 30, however, can be offset from the longitudinal axis of the tubular member 16 and may not extend completely through the bushing 12, if desired. Additionally, it is to be understood that the bore 30 and/or neck 24 can be replaced with any other structure necessary to accommodate a different type of fastener 20 or fastening method, including but not limited to a rivet, force-fit, welding or an adhesive, so long as the assembly 10 functions as described herein.

Preferably, the neck 24 has a predetermined rectangular cross-sectional configuration which, as described below, complements a portion of the clip 14 which reciprocally mounts about the neck 24. Additionally, as FIG. 1 illustrates, to seat the desired portion of the clip 14 on the body portion 22, the body portion 22 includes a channel 32 positioned about a base 34 of the neck 24.

The channel 32 preferably is formed by four shoulder members 36 integrally formed with, and upstanding a predetermined distance from, the body portion 22, one each positioned facing a side of the rectangular neck 24. The neck 24, however, can be formed in any desired shape so long as it receives the clip 14. The channel 32 and shoulders 36 can be modified to complement the neck 24 with the shoulders 36 being connected to form a single shoulder (not illustrated) if desired.

The clip 14 preferably is formed as a separate member from metal with a rectangular configuration. It is to be noted that if desired the clip 14 can be integrally formed in one-piece from the same material as the bushing 12 so long as the assembly 10 functions as described.

To attach the clip 14 to the bushing 12, the clip 14 includes a central aperture 38 and at least one arm member 40 extending away from a first bottom surface 42 of the clip 14. Preferably, the aperture 38 is rectangular to accommodate the rectangular neck 24 of the bushing 12 therethrough and there are four arm members 40, one each positioned along an edge of the rectangular aperture 38 for seating within the channel 32 of the bushing 12. To provide an engagement force between the arm members 40 and the channel 32, the arm members 40 can be formed at an angle substantially non-perpendicular to the bottom surface 42 of the clip 14 which provides a biasing force against the shoulders 36 when the arm members 40 are seated within the channel 32.

As FIGS. 1-3 illustrate, to engage the interior surfaces 28 of the first tubular member 16, the clip 14 includes four outwardly extending wings 44, one each formed about a respective corner of the rectangular clip 14. It is to be understood that the number, position and shape of the wings 44 can vary and only one wing 44 may be utilized in conjunction with an opposite side of the clip 14, if desired, so long as the clip 14 functions as described herein.

The clip 14 preferably is struck from a rectangular piece of sheet metal having a predetermined thickness and the rectangular aperture 38 is punched through the center of the clip 14. To form the arm members 40, the material removed to form the aperture 38 is bent outwardly away from the bottom surface 42 of clip 14.

As FIG. 3 illustrates, to form the wings 44, the clip 14 is provided with four U-shaped recesses 46, one each formed proximate the midpoint of each side of the clip 14. The recesses 46 enable the wings 44 to be formed by bending into the shape illustrated having a cupped corner portion 48 and bent upwardly away from a top surface 50 of the clip 14.

To firmly engage the assembly 10 within the tubular member 16, the wings 44 are formed to occupy an area slightly larger than the cross-sectional area of the first tubular member 16. Additionally, the wings 44 preferably have a selected degree of flexibility to enable slight flexing away from the second top surface 50 of the clip 14 during insertion of the assembly 10. The flexing of the wings 44 thus provides an outward biasing force to hold the assembly 10 within the first tubular member 16.

As FIG. 2 illustrates, due to the bending and flexing of the wings 44, an outside edge 52 of each wing member 44 provides contact with the surfaces 28 of the first tubular member 16. The edges 52 provide contact along a line, as opposed to an area, to enhance engagement with the first tubular member 16 and provide a slight amount of deformation or digging into the surfaces 28.

Additionally, the engagement force is increased upon attempting to pull out the assembly 10 due to the outward flexing of the wings 44 which will occur.

To connect the assembly 10 to the first tubular member 16, the clip 14 preferably is inserted about the neck 24 of the bushing 12 so that the arm members 40 are seated within the channel 32 of the bushing 12. The clip 14 and bushing 12 then are inserted within the first tubular member 16 until a distal end 54 of the neck 24 is flush with an open end 56 of the first tubular member 16. During insertion, the wings 44 of the clip 14 are flexed inward thereby providing the outward engagement force against the surfaces 28 of the first tubular member 16.

The fastener then can be threadingly engaged with the bore of the neck 24 to connect another article thereto. In order to vary the distance which the bushing 12 and clip 14 are inserted, the length of the neck 24 can be changed.

Modifications and variations of the present invention are possible in light of the above teachings. It is therefore to be understood that within the scope of the appended claims, the invention may be practiced otherwise than as specifically described.

What is claimed and desired to be secured by Letters Patent is:

1. A connector assembly for attaching a free open end of a first hollow tubular member to a second member, comprising:

a clip having means thereof for permitting said clip to be inserted in a first direction within said free open end of said first hollow tubular member and for engaging interior wall surfaces of said first hollow tubular member for preventing movement of said clip in a second opposite direction with respect to said first hollow tubular member such that once said clip is inserted within said first hollow tubular member and moved in said first direction, with respect to said first hollow tubular member, to a predetermined location, said clip will be fixedly disposed within said first hollow tubular member, at said predetermined location, with respect to movement within said first hollow tubular member in said second direction;

bushing means disposed within said first hollow tubular member; and attachment means disposed within said second member and engageable with said bushing means disposed within said first hollow tubular member for moving said bushing means in said second direction into engagement with said clip fixedly disposed at said predetermined location within said first hollow tubular member so as to fixedly connect said first hollow tubular member to said second member.

2. The assembly as defined in claim 1, wherein:

said clip is a separate member with respect to said bushing means and includes engagement means for connecting said clip to said bushing means.

3. The connector assembly as defined in claim 2 wherein said bushing means include a base portion and a neck portion extending away from one side of said base portion with a portion of said base portion forming a shoulder about said neck portion, said neck portion including a threaded bore therethrough for engaging said attachment means for attaching said second member to said bushing means, said clip including an aperture therethrough for mounting about said neck portion and said clip includes at least one axially extending arm member for insertion and releasable engagement within a recess formed in said shoulder.

4. The assembly as defined in claim 1 wherein said bushing means include alignment means for positioning of said bushing means within said hollow tubular member.

5. The assembly as defined in claim 4 wherein said hollow tubular member has a substantially rectangular cross-sectional configuration, said alignment means of said bushing means span a diagonal of said rectangular tubular member for engagement of surfaces thereof proximate opposite interior corners of said tubular member and said means of said clip provide engagement with two opposite interior surfaces of said tubular member.

6. The connector assembly as set forth in claim 5, wherein:
said alignment means of said bushing means comprises two pairs of legs for respectively engaging two interior wall surfaces of said first hollow tubular member which respectively define said interior corners of said tubular member.

7. The connector assembly as defined in claim 1 wherein said bushing means includes a threaded bore extending within said bushing means and disposed substantially parallel to a longitudinal axis of the tubular member when said bushing means is engaged therein.

8. The connector assembly as set forth in claim 7, wherein:
said bushing means comprises an axially extending neck portion within which said threaded bore of said bushing means is defined.

9. The connector assembly as defined in claim 8 wherein said clip includes an aperture therethrough for mounting about said neck portion of said bushing means housing said threaded bore of said bushing means.

10. The connector assembly as set forth in claim 9, wherein:
said axially extending neck portion of said bushing means has a substantially rectangular cross-sectional configuration; and
said aperture of said clip has a substantially rectangular configuration for surroundingly engaging said neck portion of said bushing means.

11. The connector assembly as set forth in claim 10, wherein:
said bushing means further comprises four shoulder means radially spaced from respective sides of said neck portion of said bushing means for defining four channel portions between said sides of said neck portion and said four shoulder portions; and
said clip comprises four arm members for respective disposition within said four channel portions of said bushing means.

12. The connector assembly as set forth in claim 11, wherein:
said four arm members comprise portions of said clip which have been deformed from a bottom surface of said clip so as to define said aperture of said clip within said bottom surface of said clip.

13. The connector assembly as set forth in claim 7, wherein:
said attachment means comprises a threaded fastener for threadedly engaging said threaded bore of said bushing means.

14. The connector assembly as set forth in claim 13, wherein:
said threaded fastener comprises a headed bolt.

15. The connector assembly as set forth in claim 1, wherein:
said hollow tubular member has a substantially rectangular cross-sectional configuration; and
said clip has a substantially rectangular cross-sectional configuration with said means of said clip comprising a plurality of flexible wing portions defined within respective corner portions of said clip.

16. The connector assembly as set forth in claim 15, wherein:
each side of said substantially rectangular clip is provided with a substantially U-shaped recess whereby adjacent U-shaped recesses respectively define said flexible wing portions therebetween.

17. The connector assembly as set forth in claim 16, wherein:
said flexible wing portions of said clip comprise substantially cup-shaped corner portions corresponding to interior corner portions of said hollow tubular member.

18. The connector assembly as set forth in claim 1, wherein:
said bushing means is fabricated from a plastic material.

19. The connector assembly as set forth in claim 1, wherein:
said clip is fabricated from sheet metal material.

20. The connector assembly as set forth in claim 1, wherein:
said first hollow tubular member comprises a furniture leg of a furniture piece; and
said second member comprises a support surface of said furniture piece to which said furniture leg is to be attached.

* * * * *